United States Patent [19]

Hosmer

[11] Patent Number: 4,991,863
[45] Date of Patent: Feb. 12, 1991

[54] ANTI-JACKKNIFE APPARATUS FOR TRAILER TRUCKS

[75] Inventor: Jimmy D. Hosmer, Scottsboro, Ala.

[73] Assignee: Jim-Jak, Inc., Scottsboro, Ala.

[21] Appl. No.: 502,820

[22] Filed: Apr. 2, 1990

Related U.S. Application Data

[63] Continuation-in-part of Ser. No. 418,280, Oct. 6, 1989.

[51] Int. Cl.$^5$ .............................................. B62D 53/06
[52] U.S. Cl. ...................................... 280/432; 280/433
[58] Field of Search ................................ 280/432, 433

[56] References Cited

U.S. PATENT DOCUMENTS

| | | | |
|---|---|---|---|
| 3,594,740 | 7/1971 | Coneau | 340/188 |
| 3,895,827 | 7/1975 | Padrick | 280/432 |
| 4,068,860 | 1/1978 | Meyers et al. | 280/432 |
| 4,119,330 | 10/1978 | Capps | 280/432 |
| 4,556,232 | 12/1986 | Sever | 280/432 |
| 4,585,248 | 4/1986 | Miller et al. | 280/432 |
| 4,775,165 | 10/1988 | Crovum | 280/432 |

Primary Examiner—Richard A. Bertsch
Assistant Examiner—Mitchell Bompey
Attorney, Agent, or Firm—Phillips & Beumer

[57] ABSTRACT

Apparatus for preventing jackknifing between a tractor of a trailer truck and a trailer coupled thereto is disclosed. The apparatus includes a latch block that is movable to a deployed position forward of the front edge of the tractor's fifth wheel and a pair of stop blocks, one disposed on each side of the trailer wear plate so that a laterally extending arm of the latch block will come into contact with one of them upon relative pivotal movement of the fifth wheel and trailer wear plate beyond a predetermined angle. Upon making contact, the blocks prevent further angular movement. Arms of the latch block have projecting end portions on their upper side that slide under end portions of the stop blocks which are spaced apart from the wear plate. This secures the latch block from being sprung downward past the stop block upon occurrence of jackknifing. The latch block is supported by a forward extension of the fifth wheel and by gussets that extend underneath the fifth wheel and are welded thereto. All of the blocks have a substantial thickness, providing high strength locking action, and the blocks and supporting structure may be secured to the fifth wheel and wear plate by welding and without cutting of holes or slots in those members. The disclosed structure also includes sensors and switching devices for automatically deploying and retracting the latch block at predetermined speeds, as well as an electronic control and monitoring module that records the history of deployment and retraction events.

19 Claims, 4 Drawing Sheets

ANTI-JACKKNIFE APPARATUS FOR TRAILER TRUCKS

CROSS REFERENCE OF RELATING APPLICATION

This application is a continuation-in-part of application Ser. No. 418,280, filed Oct. 6, 1989, pending.

FIELD OF THE INVENTION

This invention relates to apparatus for preventing jackknifing between truck tractors and connected trailers.

BACKGROUND OF THE INVENTION

One of the problems associated with operation of trailer trucks in the tendency of the tractor and attached trailer to jackknife under certain conditions. Tractors and trailers are conventionally coupled together by a fifth wheel on the trailer in which a kingpin secured to the trailer is pivotally received. This coupling enables the tractor to pull the trailer and provides for relative pivotal movement for maneuvering the vehicle. Jackknifing occurs when the trailer pivots relative to the tractor to an extent such that the operator can no longer maintain or recover control over the vehicle. Typical driving conditions which may cause jackknifing are those in which the tractor wheels are made to lock and slide or to spin; in either case, the direction of the wheel can no longer be controlled, and it takes the path of least resistance. Improper braking or steering and accelerating or decelerating too fast can all cause jackknifes, especially on roads made slick by rain, snow, or ice. Anti-jackknifing arrangements have been developed to prevent or minimize jackknifing action by limiting the allowable pivotal movement between the tractor and trailer.

Various anti-jackknifing devices for installation on trailer trucks are disclosed in prior patents. In general, these devices include a first stop retractably mounted on either the fifth wheel or on a wear plate under the trailer and a pair of cooperative stops mounted spaced apart on the other of these members. The pair of stops limit pivotal movement beyond a predetermined angle when engaged by the first stop. U.S. Pat. Nos. 4,556,232, issued Dec. 3, 1985, to Server; 4,585,248, issued Apr. 28, 1986, to Miller et al.; and 4,120,514, issued Oct. 7, 1978, to Sanders, disclose arrangements wherein an auxiliary pin is mounted on the fifth wheel and is deployable upward so as to be positioned in an arcuate slot in the wear plate under the bottom of the trailer. Pivotal movement of the tractor in these devices is limited by the length of the slot, the pin being stopped when it engages an end of the slot. U.S. Pat. No. 4,119,330, issued Oct. 10, 1978, to Capps, discloses the use of a pair of spaced abutments on the fifth wheel and a movable stop on the trailer. U.S. Pat. No. 3,895,827, issued July 22, 1975, to Padrick, discloses mounting of a stop block on the fifth wheel platform for movement upward into an arcuate recess at the periphery of the wear plate on the trailer, stopping action occurring by engagement of the block with the edge defining an end of the recess. The devices disclosed in these patents include features such as a pneumatic or hydraulic cylinder and suitable linkage for deploying and retracting the stop in and out of its operating position.

Prior anti-jackknifing arrangements as discussed above present a disadvantage in that they require cutting into the fifth wheel and/or the wear plate of the trailer in order to provide necessary slots or recesses for operation of the movable stop member. This requirement makes installation of the apparatus on the fifth wheel and trailer plate difficult, and the resulting slots or recesses substantially reduce the strength of the plate or fifth wheel, creating weak points susceptible to failure. It would be desirable to provide anti-jackknifing apparatus that may be installed on existing trailers and fifth wheels by means such as welding without cutting slots or recesses in existing structural members. Apparatus with such features is disclosed in my co-pending application, referenced above. That apparatus included a brick-shaped latch block deployable from a stowed position below the fifth wheel and engageable when deployed upward with similarly shaped stop blocks secured to the bottom of the wear plate of the trailer. In this apparatus, flush contact of the end of a stop block is made by a side of the latch block adjacent to its forward end when deployed. This arrangement proved unsatisfactory when undergoing tests in that the deployed latch block end, when subjected to the severe forces encountered in an actural jackknifing situation, was sprung downward out of position and past the stop block, thus allowing the trailer and tractor to jackknife. Structure that provides for interlocking of the engaging blocks so as to prevent failure due to being sprung out of position is therefore required.

Other features needed for optimum use of such apparatus include a means for automatically disabling the system at low speeds to enable routine turning of the truck and means for monitoring and recording a history of occurrences of activation and deactivation of the system.

SUMMARY OF THE INVENTION

The present invention is directed to anti-jackknifing apparatus for limiting pivotal movement between the fifth wheel of a truck tractor and the trailer to which the tractor is coupled. The apparatus includes a pair of stop blocks fixedly attached to the underside of a wear plate on the bottom of the trailer, one stop block being disposed on each side of the wear plate outside the radius traversed by the fifth wheel in turning. A latch block having arms that are engageable in intermeshing relation with the stop blocks upon turning the tractor past a predetermined angle is disposed on a support structure that includes a forward extension of the fifth wheel. Means are provided for movement of the latch block from an inactive, retracted position where it will not come into contact with the stop blocks to a forwardly deployed, active position where its arms will come into such contact and prevent further pivotal movement. The support structure preferably includes a forwardly extending plate coplanar with and attached to the front edge of the fifth wheel and gussets that extend underneath the fifth wheel, with these components being secured to the bottom, front edge, and edge flange of the fifth wheel. The latch block may be pivotally mounted to the support frame for activation movement upward between gussets into a forward extending slot at the front of the support plate. This arrangement enables the latch block to be securely held between gussets on each side of the aperture when deployed. The stop blocks have a projecting end portion spaced apart from the trailer wear plate, and the arms of the latch block have projecting portions on the outer ends of its arms that are adapted to slide over the stop block projections in intermeshing relation, thus securing the latch block from being sprung downward and out of position upon occurrence of jackknifing. Means may also be provided for automatically deploying and retracting the latch block at predetermined speeds and for monitoring and recording operation of the apparatus. Apparatus embodying the invention may be readily installed on existing tractors and trailers by welding, without cutting holes or slots in either the fifth wheel or the trailer wear plate. Stronger and more reliable locking action is obtained upon contact being made between arm ends and stop blocks of substantial thickness with one another when compared to contact between pins or blocks and edges of slots or recesses in plates as shown in prior apparatus for this purpose. Tests of apparatus embodying the invention under actual jackknifing conditions have shown favorable results, with the latch blocking being effectively restrained from springing downward out of position as in the apparatus described above.

It is, therefore, an object of this invention to provide improved apparatus for preventing jackknifing between truck tractors and trailers.

Another object is to provide such apparatus that may be installed on existing fifth wheels of tractors and wear plates of trailers without cutting holes or slots therein.

Another object is to provide anti-jackknifing apparatus that includes members that become interlocked with one another so as to avoid being sprung out of position upon engagement with one another.

Yet another object is to provide such apparatus that may be activated and deactivated automatically at predetermined speeds.

Still another object is to provide anti-jackknifing apparatus that includes means for monitoring and recording the operation thereof.

Other objects and advantages of the invention will be apparent from the following detailed description.

DESCRIPTION OF THE PREFERRED EMBODIMENT

Figure 1:
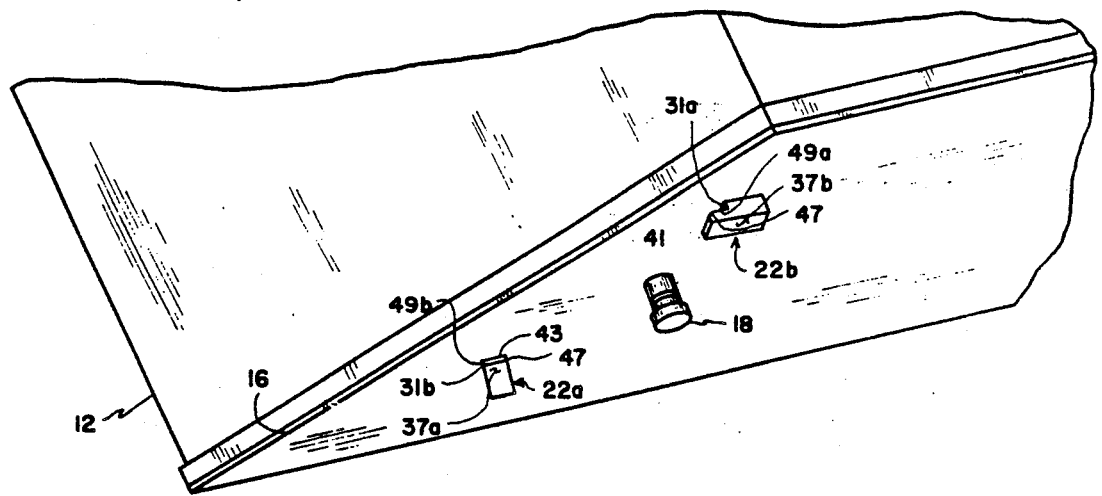
FIG. 1 is a pictorial view of a truck tractor and trailer with apparatus embodying the invention attached thereto, the trailer being shown broken apart and tilted away from the tractor for purposes of clarity.
Figure 1:
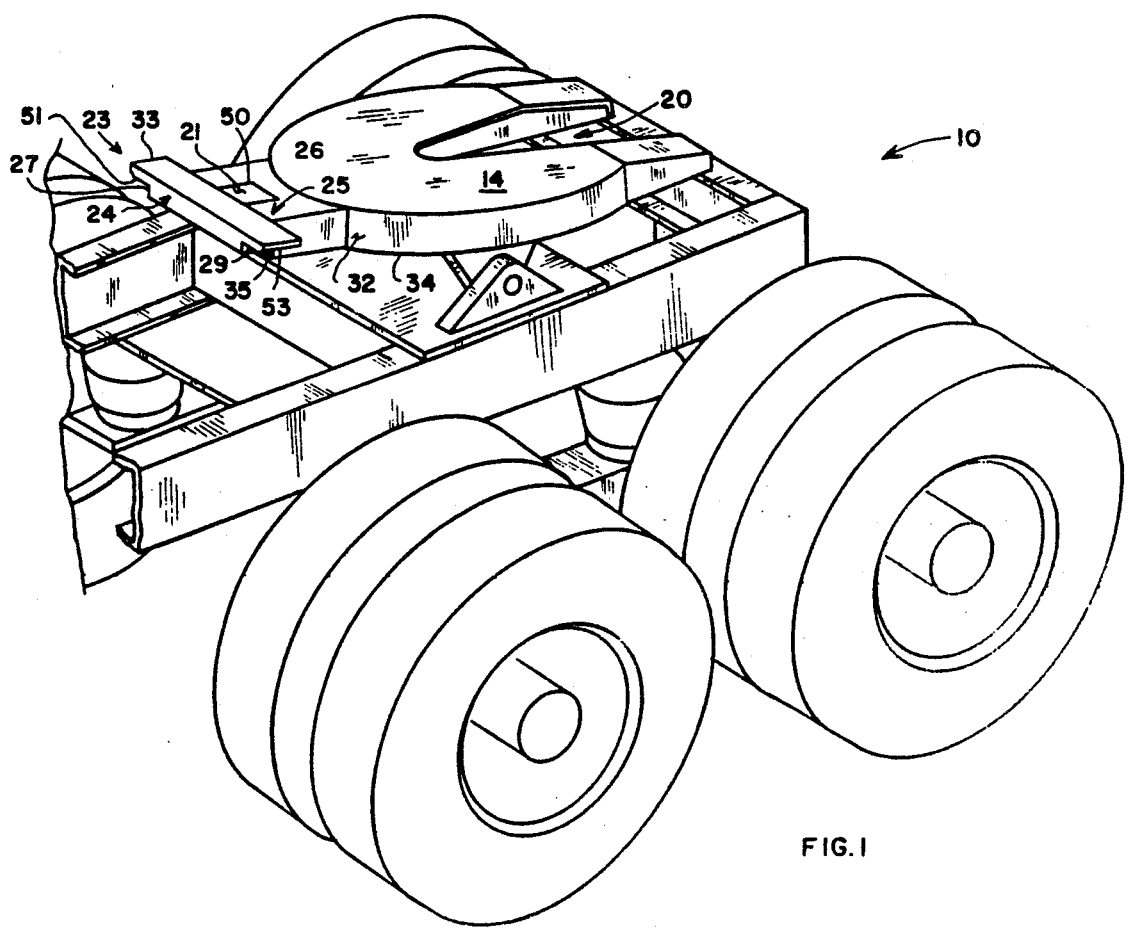

Referring to FIG. 1 of the drawings, there is shown a trailer truck that includes a tractor 10 disposed for coupling with a trailer 12 by means of a fifth wheel 14 mounted on the trailer and a kingpin 18 mounted on a wear plate 16 at the bottom of the trailer. Kingpin 18 resides at the forward end of slot 20 in the fifth wheel when coupled therewith. Relative pivotal movement between the tractor and trailer occurs around the axis of the kingpin when the truck is turning.

Figure 2:
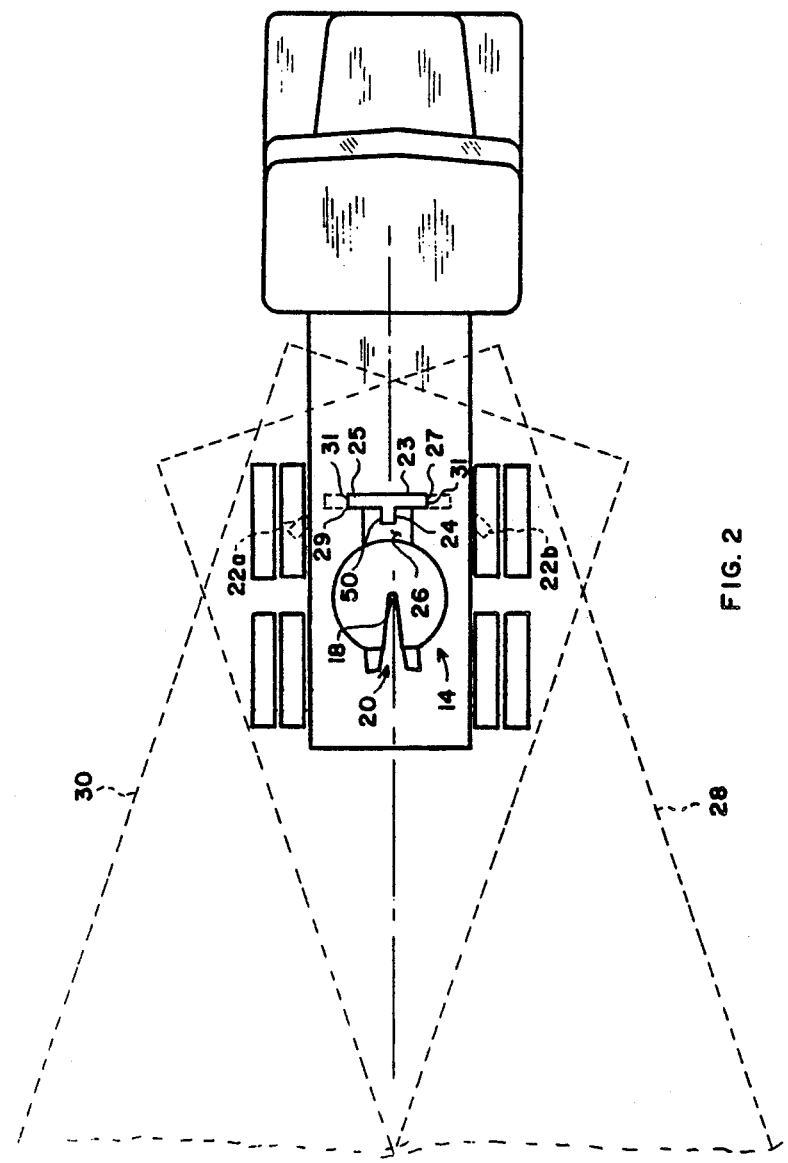
FIG. 2 is a top plan view with left and right positions of the trailer shown in dotted lines.

As shown in FIG. 2, prevention of jackknifing is realized by interaction of stop blocks 22a and 22b fixedly mounted on the underside of the trailer wear plate and laterally extending arms 23 and 25 of deployable latch block 24 supported within forwardly extending slot 50 in forward extension plate 26 of the fifth wheel. The stop blocks are located in position such that the trailer is free to move to the right or left positions 28, 30 shown in dotted lines before the latch block comes into contact with the left or right stop blocks, respectively. When the trailer is in the left position 30, contact is made between left stop block 22a and arm 25 of the latch block, and when in the right position 28, contact is made by right stop block 22b and arm 23 of the latch block. The stop blocks may be positioned to allow turning to the extent of a predetermined maximum angle such as 15° to 20° either the left or right, and preferably 19°. Upon contact being made between an end surface 27 or 29 of a latch block arm and surface 31a or 31b of a stop block, further angular movement is prevented.

Figure 3:
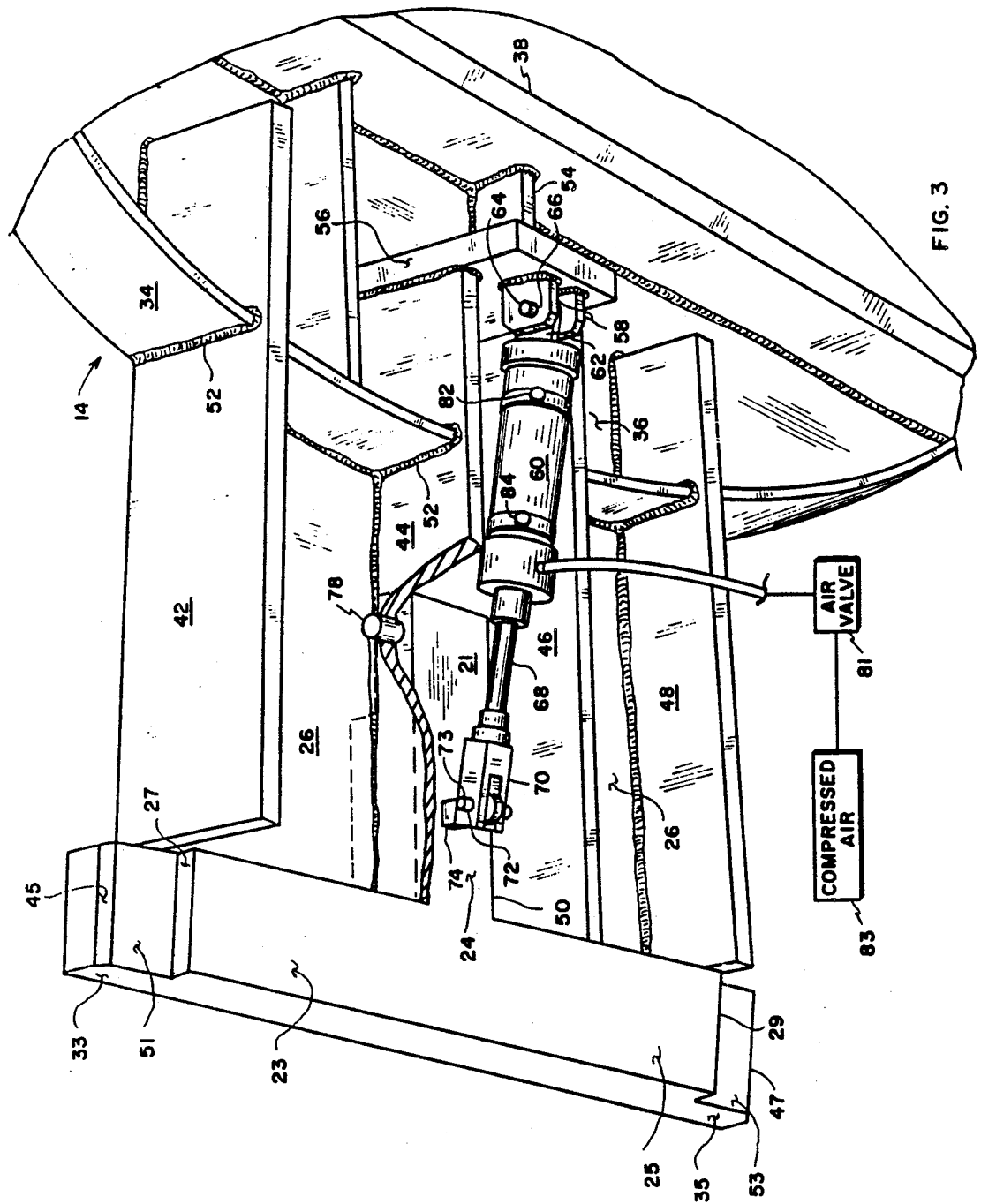
FIG. 3 is a pictorial view, partly broken away, taken from underneath a tractor fifth wheel.

FIG. 3 shows framework for mounting and securing the latch block and means for deploying and retracting it. The framework includes an extension plate 26 disposed coplanar with the fifth wheel. The extension plate has an arcuate rear edge conforming to the front edge of the fifth wheel, left and right side edges parallel to the length of the tractor, and front edges disposed at an angle such as 15° more than a right angle with the side edges so as to keep the front corners of the plate from engaging the stop blocks. Longitudinally extending gussets 42, 44, 46, and 48 in the form of rectangular beams in spaced-apart relation to one another are disposed underneath the extension plate and fifth wheel, the gussets having notches 52 in their upper sides to enable their being fitted over flange 34 of the fifth wheel. The extension plate has a forward-extending rectangular slot 50 defined by inner sides of innermost gussets 44 and 46, this slot enabling the latch block to be brought upward to a deployed position with its upper side coplanar to the surface of the fifth wheel. Extension plate 26 is welded to upper edges of the gussets, and the gussets are welded to the fifth wheel flange 34 at notches 52. Rear edges of the outermost gussets 42 and 48 are welded to a cross bar 38 of the fifth wheel, and top edges of all gussets are welded to the underside 36 of the fifth wheel as well as to the extension plate. An anchor plate 56 parallel to and spaced apart from cross bar 34 is disposed at the middle of the forward portion of the fifth wheel, secured by bracing plate 54 and by being welded to the underside of the fifth wheel and to rear edges of the innermost gussets 44 and 46.

Deployment of the latch block into position such that the outer end of one of its arms will engage a stop block upon turning the vehicle to a predetermined angle is accomplished in the embodiment shown by means of an air cylinder 60 which functions as a linear actuator with a shaft 68 being projected forward upon application of air pressure to the cylinder from a source 83 of compressed air through air valve 81. The base of the air cylinder is pivotally secured to spaced-apart tabs 58 extending forward from anchor plate 56 by means of a bolt 64 extending through apertures 66 therein and through apertured tab 62 connected to the base of the air cylinder. Shaft 68 is operably secured to the latch block by means of a clevis 70 at its outer end and a bolt 73 engaged therewith and extending through tab 74 projecting downward from the latch block.

Latch block 24 is generally T-shaped, having a longitudinally extending body portion 21 deployable between gussets 44 and 46 and laterally extending arms 23 and 25. The arms are preferably disposed at right angles to the body portion, and the top surfaces and body of the latch block are preferably located so as to be coplanar with the upper surface of the extension plate when deployed. The latch block body, when deployed, also has a substantial area of side faces disposed closely adjacent to sides of gussets 44 and 46 so that contact with the gussets would prevent the latch block from being forced out of position by forces generated upon occurrence of jackknifing. The latch block is mounted on the innermost gussets for pivotal, up-and-down movement around pin 78 which extends transversely through an aperture in the block and aligned apertures in the gussets. A region 80 of reduced thickness is provided at the upper rear corner of the latch block to enable it to stay out of contact with stop blocks when in retracted position.

Arms 23 and 25 have a configuration at their ends that enables intermeshing with the stop blocks in a manner such as to secure the latch block from being sprung downward and past a stop block upon jackknifing. The arms have a generally rectangular shape with an end surface 27 or 29 that is engageable with a mating stop block surface 31a or 31b, the respective surfaces being disposed to come into flush contact with one another. Ends of the arms on its lower side have a transversely extending corner notch defined as projecting end regions 33 and 35 of reduced thickness on their upper sides, the end regions being arranged to slide over and be received by projecting end regions 37a or 37b of the stop blocks that are spaced apart from the trailer wear plate. Lower, outer corners of arm ends 33 and 35 may also have transversely extending bevelled corner regions 45 and 47 to facilitate engagement with the stop blocks.

Stop blocks 22a and 22b have a generally rectangular shape and have corner notches on their upper sides defined by projecting end regions 37a and 37b of reduced thickness spaced apart from the trailer plate. Surfaces 31a and 31b, disposed in planes perpendicular to the length of the arms, are arranged to come into flush contact with arm end surfaces 27 and 29. To facilitate engagement of the latch block arms and a stop block, upper edges of end regions 37a and 37b of the stop blocks may be provided with bevelled sections 41 and 43, and the upper edge of end regions 33 and 35 may likewise have bevelled sections 45 and 47. Projecting end regions 37a and 37b of the stop blocks on their upper sides have flat surfaces 49a and 49b parallel to the trailer wear plate and disposed to come into face-to-face, parallel relation with surfaces 51 and 53 on the lower side of end regions 33 and 35 of the arms. Upon engagement of the blocks with one another, further lateral movement of the latch block is blocked by contact of a vertically disposed surface 27 or 29 thereof with surface 31a or 31b of a stop block, and downward movement as might otherwise occur owing to a tendency of the latch block to be sprung downward past a latch block is restrained by contact of a horizontally extending surface 49a or 49b of an arm end with a mating horizontal surface 51 or 53 of a latch block end region disposed below the projecting end region of the latch block arm.

Dimensions of the latch block and stop blocks may be selected to provide mating surfaces having a large area compared to that obtainable from edges of slots or apertures in the fifth wheel or trailer wear plate. The longitudinal body portion of the latch block preferably may have a width of three inches, a thickness of at least two inches, and a length such as to extend three inches past the front edge of the fifth wheel extension plate when deployed, with at least three inches of its sides being disposed against sides of the gussets and extension plate edges when in such position. This provides for a substantial area of contact with both the stop blocks and the gussets when jackknifing occurs. Arms of the latch block may have a length of 15 inches, a width of 3 inches, and a thickness of 2 inches, with the arm ends at their lower edges being notched to provide a projecting region 2 inches long and 1 inch thick. The stop blocks may have an overall length of 6 inches, a width of 3 inches, and a thickness of 2 inches with an upper inside corner being notched to provide lower projecting end regions 2 inches long and 1 inch thick. The stop blocks preferably are made of metal such as steel and may be joined to the bottom of the trailer plate by welding in positions such that an end region thereof will come into flush engagement with an end region of the latch block as described above.

Figure 4:
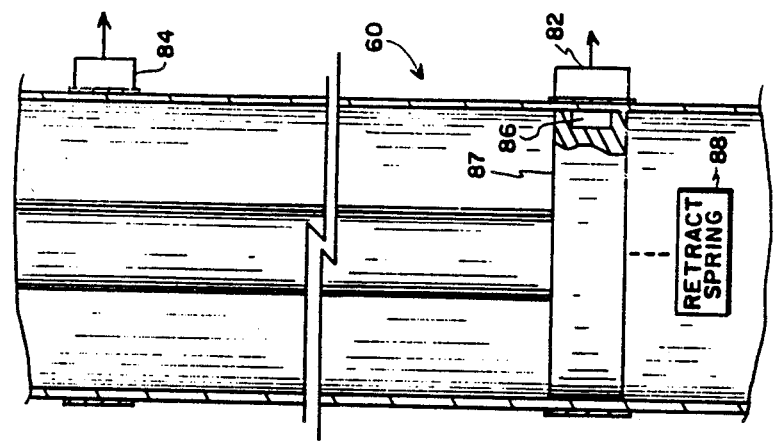
FIG. 4 is a partial cut-away view of an air cylinder device for deployment of a latch block and sensors connected to the air cylinder.

A switchable, solenoid-operated air valve 81 coupled to compressed air source 83 is provided for actuation of the air cylinder, with switching of the valve preferably being controlled automatically as described below. The air cylinder may also include a pair of sensors 82, 84 that generate signals responsive to the position of air cylinder piston 87, the first sensor 82 detecting the position of the piston when fully retracted and the second sensor 84 detecting its position when fully extended. As shown in FIG. 4, sensors 82 and 84, attached by bands near the base and upper end, respectively, of air cylinder 60, are responsive to the location of magnetic material 86 in air cylinder piston 87, the remaining portions of the air cylinder and shaft being made of nonmagnetic material. The air cylinder also includes a spring 88 which, in combination with force exerted by the weight of the latch block, causes the latch block to be retracted upon turning the compressed air supply off. In the event that the latch block does not become fully retracted but comes to rest in an in-between position, this condition may also be derived from the sensors so that a warning buzzer may be sounded, alerting the vehicle driver.

Figure 5:
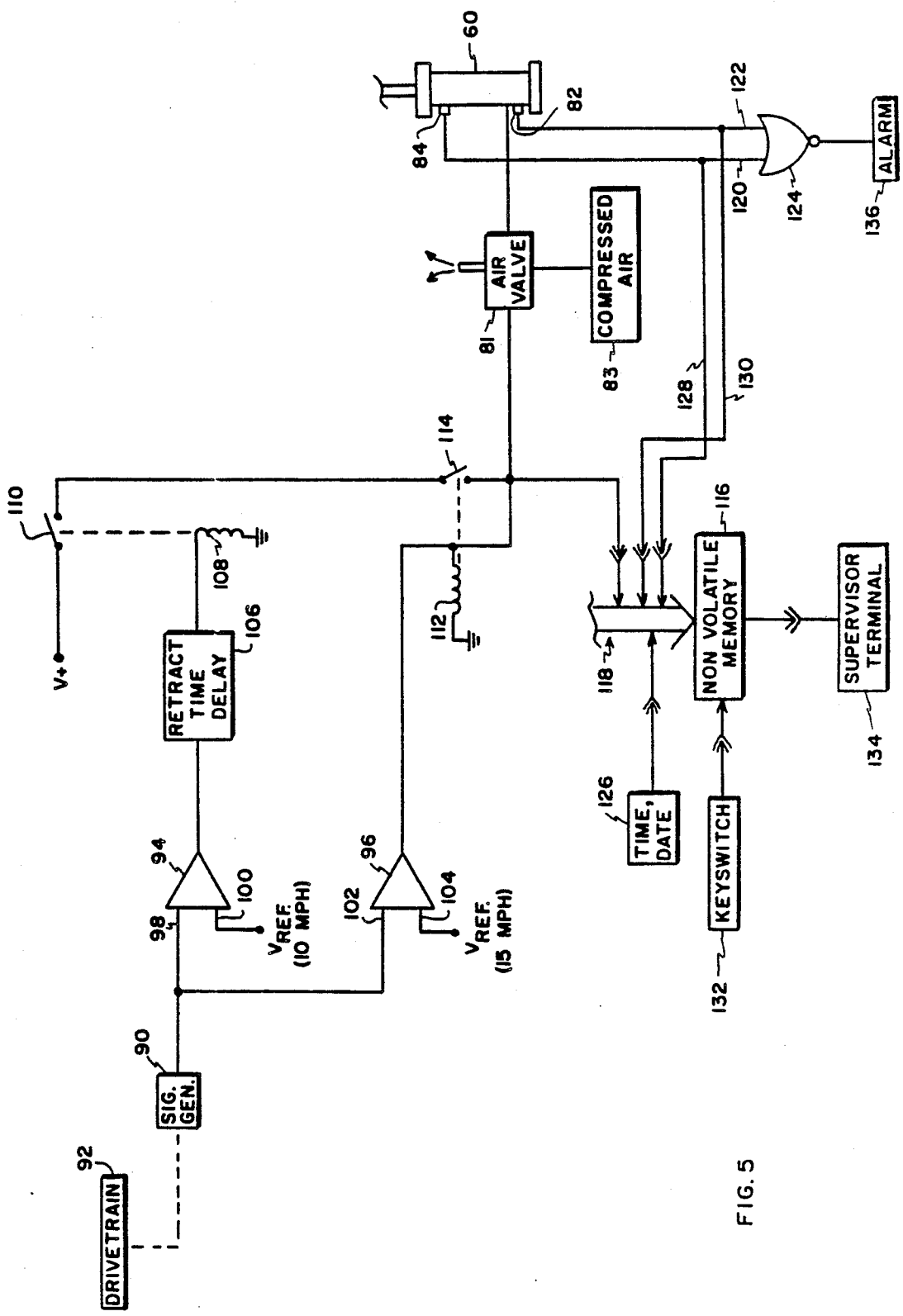
FIG. 5 is a schematic diagram showing control and monitoring features of the invention.

A preferred mode of operation for deployment and retraction of the latch block is to couple the air cylinder to a speed-responsive signal generator so that the valve may be turned on and off automatically at predetermined speeds. This may be done as shown in FIG. 5 wherein signal generator 90 provides a speed-indicating signal derived from the vehicle drive train 92. The signal generator may be connected in operative relation between the vehicle transmission and its speedometer cable by means of a suitable adapter. Signal generator 90 may be an analog generator that provides a rising or falling voltage proportional to speed, or it may be a pulse device that provides a string or series of pulses, the frequency of which is proportional to vehicle speed.

The speed-responsive signal is applied to comparators 94 and 96, with comparator 94 enabling retraction of the latch block, and comparator 96 enabling its deployment. A speed signal is applied to terminal 98 of comparator 94, to which a reference is also applied to terminal 100, the reference signal being representative of the desired retraction speed, which may, for example, be 10 miles per hour. The same speed signal is also applied to terminal 102 of comparator 96, with a reference signal representative of the desired deployment speed, which may be 15 miles per hour, being applied to terminal 104. A time delay 106 is coupled to the output of comparator 94 to prevent retraction of the latch block during an actual jackknifing event, a delay of 15 seconds being suitable for this purpose. The output of time delay 106 energizes a relay coil 108 which closes contacts 110 and applies power to one side of normally open relay contacts 114. Upon reaching a vehicle speed of 15 miles per hour, comparator 96 provides an energizing signal to relay coil 112, which closes contacts 114. This applies power to switching valve 81, in turn supplying compressed air from source 83 to air cylinder 60.

In the instance when the truck is decelerating as the vehicle speed falls below 15 miles per hour, comparator 96 removes its energizing signal from relay coil 112, but coil 108 remains energized, maintaining current flowing through contacts 110 back to coil 112 via closed contacts 114. Thus, the self-latching relay composed of coil 112 and contacts 114 maintains power at switching valve 81 as long as the vehicle speed remains above the 10-miles-per-hour reference applied to comparator 94. When vehicle speed falls below 10 miles per hour, the output of comparator 94 falls to zero; and after the selected retract time delay, coil 108 is no longer energized, opening contacts 110 and simultaneously removing power from relay coil 112 and switching valve 81, causing cylinder 60 to retract.

Information pertaining to the control system may be stored in a memory 116 having a data buss 118 conventionally controlled by a microprocessor (not shown). Memory 116 may be a nonvolatile memory, such as a magnetic media or a bubble memory. Sensors 82 and 84 provide signals to inputs 120 and 122 of NOR gate 124 when the air cylinder piston is fully retracted or fully deployed, respectively. In the event that the piston malfunctions and is disposed at a position between the two sensors, neither of the sensors will provide a logical one output, and NOR gate 124 provides an output to alarm 136, which may be a buzzer audible to the driver of the truck. When the latch block is operating properly, that is, when it is either fully retracted or fully deployed, one of the sensors will provide a logical one to NOR gate 124 so that no output is provided to alarm 136, keeping it deactivated. Power for operation of the control and monitoring system may be supplied by the vehicle battery and conventional wiring.

Memory 116, as described earlier, is coupled as shown to a clock 126 which provides time and date information to memory 116 in conjunction with the condition of cylinder 60 via lines 128 and 130, also coupled to data buss 118. The contents of memory 116 are accessible via a key switch 132 which enables a plug-in terminal 134 to read the contents of memory 116 or change the programming of the microprocessor (not shown). Key switch 132 may be made accessible to supervisors only so that the history of jackknifing events cannot be tampered with by the vehicle drive, and accurate records would be available for investigative purposes.

While the invention is described above in terms of specific embodiments, it is not to be understood as limited thereto but is limited only as indicated by the following claims.

I claim:

1. An apparatus for limiting turning movement between a truck tractor and a trailer coupled thereto by means of a kingpin secured to and extending downward from a wear plate under the trailer and a kingpin-receiving aperture in a fifth wheel horizontally disposed on the tractor, the fifth wheel having a front edge that traverses an arcuate path against said wear plate upon relative movement of the tractor and trailer around the axis of the kingpin, comprising:

a pair of stop blocks securable to the underside of said wear plate on opposite sides thereof outside said arcuate path;

a latch block supportable by said fifth wheel and movable back and forth from a deployed position substantially coplanar with the fifth wheel and extended forward from said front edge, whereby the latch block will come into contact with one of said stop blocks upon turning of the vehicle to a predetermined extent, to a retracted position where the latch block will not come into such contact;

said latch block including a longitudinally extending body and a pair of laterally extending arms each having an end region adapted to engage a stop block in intermeshing relation, preventing further lateral or downward movement upon making contact therewith;

wherein said end regions have a vertically extending end surface and a corner notch on the lower side of the region defining a section of reduced thickness adjacent to said end surface and the stop blocks at their inward facing ends each having a vertically extending surface adapted to come into flush contact with a said end surface of a latch block arm and a projecting ledge defining a cavity for receiving said area of reduced thickness above the ledge and securing the latch block and from being sprung downward past a stop block upon being engaged;

means for deploying said latch block; and framework means for supporting said latch block and said means for deploying the same.

2. Apparatus as defined in claim 1 wherein said latch block arms are generally rectangular and each of them at its outer end and on its lower side has a generally rectangular-shaped recess adjacent to the end, defining an end region of reduced thickness with a flat lower surface.

3. Apparatus as defined in claim 2 wherein said stop blocks are generally rectangular in shape and each of them at its inward facing end has a generally rectangular-shaped recess on its upper side adjacent to said end, said recess being adapted to receive said end region of reduced thickness of a latch block arm upon being engaged therewith.

4. Apparatus as defined in claim 1 wherein said framework means includes a plurality of forward extending gussets securable to the undersides of said extension plate and said fifth wheel, the innermost two of said gussets having flat inner side faces extending downward from said edges of said plate that define said slot and coplanar therewith, providing a closely fitting face-to-face relationship with side faces of said latch block when deployed.

5. Apparatus as defined in claim 4 wherein said fifth wheel includes an arcuate front edge, a flange extending perpendicularly downward therefrom, and a a cross brace extending transversely across the fifth wheel and underneath the same, and said gussets include notches in their upper edges for engaging and being secured to said flange.

6. Apparatus as defined in claim 5 wherein rearward ends of at least a pair of said gussets are securable to a side of said cross brace.

7. Apparatus as defined in claim 6 wherein said latch block is pivotally mounted on the innermost two of said gussets.

8. Apparatus as defined in claim 7 wherein said means for deploying said latch block comprises an air cylinder having a piston and an extendable shaft connected thereto.

9. Apparatus as defined in claim 8 wherein said latch block has a transversely extending aperture near its rearward end adapted to receive a pivot pin supported by said two gussets.

10. Apparatus as defined in claim 9 including means projecting downward from said latch block and spaced forward of said aperture for receiving and pivotally supporting engagement means attached to an actuator shaft of said air cylinder.

11. Apparatus as defined in claim 10 wherein said means for deploying said latch block includes a switchable valve operatively connected to said air cylinder.

12. Apparatus as defined in claim 11 including means for deriving a signal responsive to vehicle speed and means for turning on said valve at a predetermined speed in response to said signal.

13. Apparatus as defined in claim 12 including means for turning off said valve at a predetermined speed in response to said signal.

14. Apparatus as defined in claim 13 including delay means coupled to said means for turning off said valve.

15. Apparatus as defined in claim 14 including means for generating a signal when said shaft is fully extended or fully retracted.

16. Apparatus as defined in claim 15 wherein said means for generating a signal comprises magnetic material disposed in said piston and a pair of sensors, one each at opposite ends of said cylinder, said sensors being responsive to the presence of said magnetic material when the piston is in either fully extended or fully retracted position.

17. Apparatus as defined in claim 16 including alarm means responsive to the location of the piston in a partially deployed position.

18. Apparatus as defined in claim 17 including clock means and memory means operatively connected to said clock means and said pair of sensors to record in the memory means the date and time of deployment and retraction events.

19. Apparatus as defined in claim 18 including key switch means providing access to said memory means.

* * * * *